Nov. 25, 1958 J. D. MILLER 2,861,748
FEEDER CUTTER STRUCTURE IN A RADIAL BLADE ROTOR MILL
Filed June 1, 1956 2 Sheets-Sheet 1
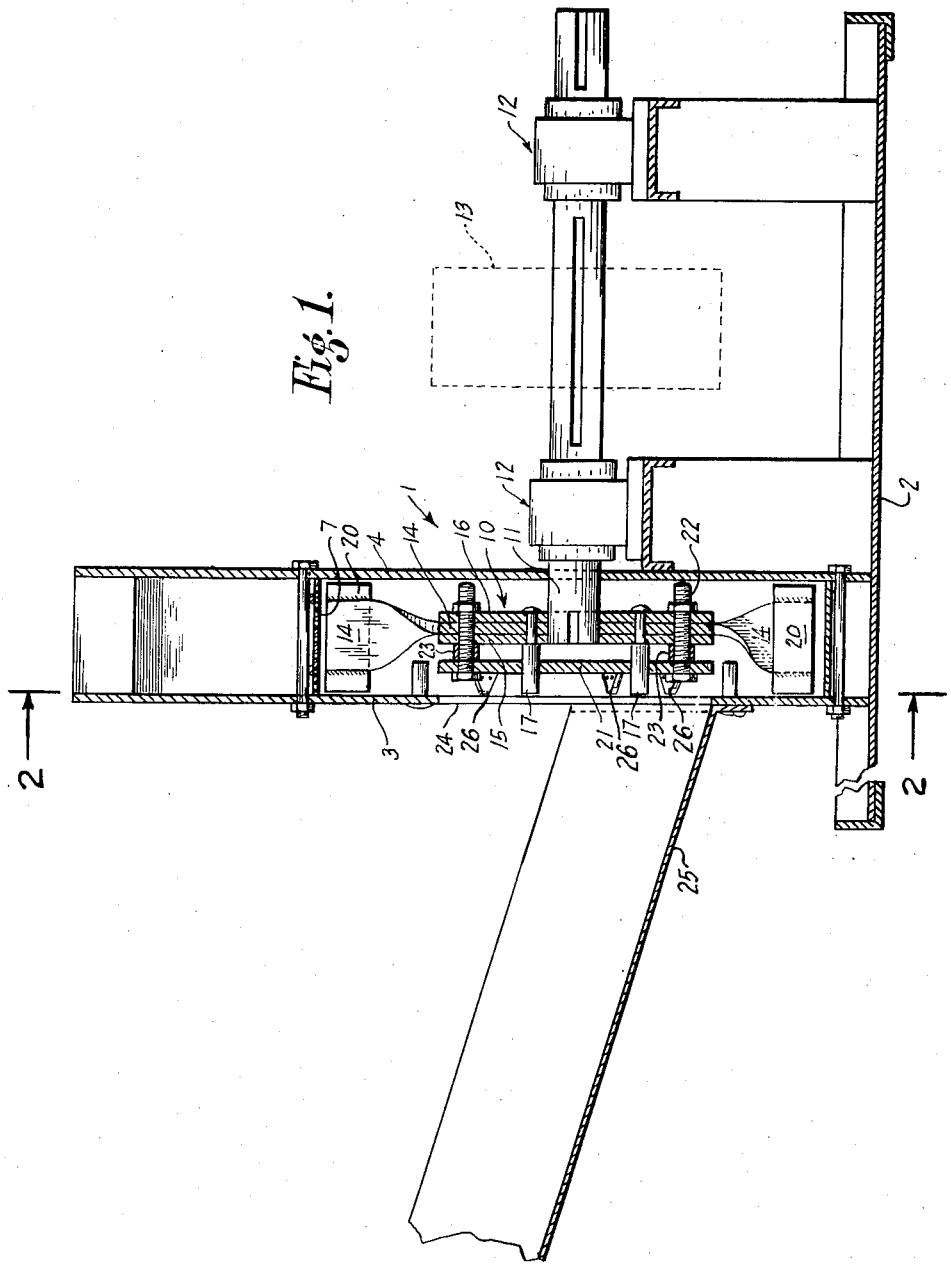
INVENTOR
John D. Miller
BY
A. Schapp
ATTORNEY Nov. 25, 1958  J. D. MILLER  2,861,748
FEEDER CUTTER STRUCTURE IN A RADIAL BLADE ROTOR MILL
Filed June 1, 1956  2 Sheets-Sheet 2
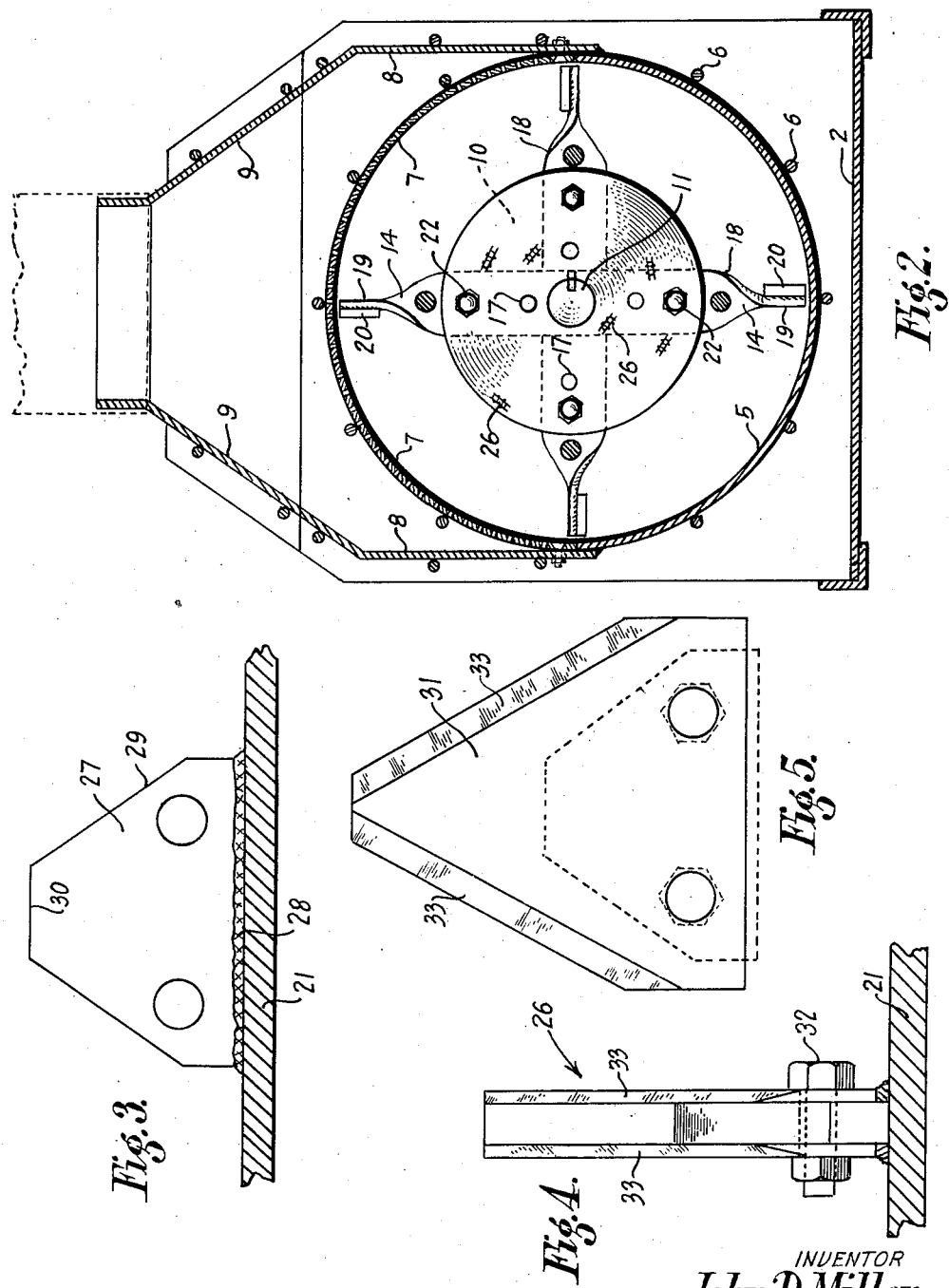
INVENTOR
John D. Miller
BY
A. Schapp.
ATTORNEY

United States Patent Office 2,861,748
Patented Nov. 25, 1958

2,861,748

FEEDER CUTTER STRUCTURE IN A RADIAL BLADE ROTOR MILL

John D. Miller, Modesto, Calif.

Application June 1, 1956, Serial No. 588,702

2 Claims. (Cl. 241—186)

The present invention relates to improvements in a feeder cutter structure in a radial blade rotor mill, and has particular reference to the feed mill or pulverizer described in Patent No. 2,248,640, to I. T. Miller, dated July 8, 1941.

The feed mill or pulverizer described in the above patent is intended for the grinding of stock feed, such as alfalfa hay and grain hay, and the hay may be fed in loose form or in the form of bales. The machine has been in successful use on cattle ranches, dairy farms, and wherever there is a demand for a machine capable of grinding feed of the character described.

The patented machine comprises in its principal features, a housing having parallel front and rear walls, with a feed opening in the front wall, and having a cylindrical screen mounted between the walls, a rotor mounted in the housing concentric with the screen and having a front plate facing the opening, means for feeding a bale of hay or the like through the opening upon the face plate, and propeller blades on the rotor made to pass the screen and to set up an air-blast drawing on the opening and discharging through the screen.

The front plate of the pulverizer has a series of prongs projecting therefrom to tear into the hay and to feed loosened bunches of hay into the air-blast, the loosened hay being whirled against the screen by the propeller blades and discharged through the screen in a reduced state.

The capacity of this mill depends largely upon the speed with which the propeller blades and the screen can take care of the bunched hay thrown against the screen.

The capacity of the mill is also affected by the character and quality of the hay, perfectly cured hay being much easier to handle than hay that has been less well cured, or has become tough through weather conditions, lying out-doors with little or no protection.

In the present invention, it is proposed to provide an improvement in the patented mill, which will greatly increase the capacity of the same, as much as fifty percent, and which will cause the mill to handle the toughest kind of hay with little difficulty.

This object I accomplish by providing means in connection with the face plate of the rotor whereby the hay is partly reduced simultaneously with the tearing out of the same away from the bale, so that it is entrained in the air-blast and thrust against the screen in partly reduced form, thus easing the load on the screen to a mere final reduction, and increasing the capacity of the mill.

Further objects and advantages of my invention will appear as the specification proceeds, and the new and useful features of my feed mill will be fully defined in the claims attached hereto.

The preferred form of my invention is illustrated in the accompanying drawing, forming part of this application, in which:

Figure 1 shows a vertical section through my improved feed mill;

Figure 2, a section taken along line 2—2 of Figure 1;

Figure 3, a detail side view of a base plate used for mounting desired cutters on the face plate;

Figure 4, a detail side view of a cutting blade used in my invention; and

Figure 5, an end view of my blade assembly.

While I have shown only the preferred form of my invention, it should be understood, that various changes or modifications may be made within the scope of the claims hereto attached, without departing from the spirit of the invention.

Referring to the drawing in detail, my improved feed mill comprises a relatively narrow housing 1 supported on a base 2, the housing having parallel front and rear walls 3 and 4, with a semi-cylindrical bottom 5 mounted between the walls and supported by bolts 6, a semi-cylindrical screen 7 mounted over the bottom 5 in inverted relation, and side walls 8 rising from the upper edges of the bottom and tapering toward one another, as at 9, to form a chimney.

The bottom 5 and the screen are made to the same diameter so as to form a continuous cylinder.

Within the cylinder, and concentric therewith, is a rotor 10, supported on a shaft 11, which, in turn, is mounted in two bearings 12 disposed outside the housing, the shaft being driven by any suitable means through a pulley 13.

The rotor comprises four blades 14 having their inner sections arranged in co-planar relation between two discs 15 and 16, the blades and the discs being held in assembled relation by means of four prongs 17 having reduced rear ends extending through the assembly and suitably welded thereto.

The prongs 17 extend forwardly of the assembly, are preferably arranged on radii 90 degrees apart and at different radial distances from the center of rotation, one being fairly close to the center, one being fairly close to the periphery of the rotor, and the other two in between.

The prongs may be readily located by drawing a spiral about the axis of rotation and marking the four points on the spiral 90 degrees apart. They are circular in cross section, have no cutting edges, and are merely intended for tearing into the bale of hay fed toward the rotor and for throwing loosened bunches of hay outward.

The blades 14 are twisted immediately outside the rotor, through a 90 degree angle, as at 18, and present transverse end portions 19, which again carry transverse vanes 20 extending through the full width of the housing in close proximity to the screen 7.

The twists in the blades have a propeller effect so as to pass material thrown out by the rotor adjacent the front wall through the full width of the housing.

The prongs 17 carry a face plate 21, which latter is slidable on the prongs and is adjustable with respect to the rotor.

The face plate 21 is held to the rotor by a series of bolts 22 having heads bearing on the face plate and nuts bearing on the rear of the rotor, with washers 23 interposed between the face plate and the rotor, so that the spacing between the rotor and the face plate may be adjusted by interposition of a selected number of washers.

The front wall of the housing is formed with a circular opening 24 corresponding in size to the circular face plate. The latter is mounted rearwardly of the front wall and the opening, and the spacing may be adjusted by proper selection of washers 23.

It will be understood that for the pulverizing of tough hay, the plate will be adjusted forwardly to reduce the feed, while for brittle hay, it will be adjusted rearwardly to increase the feed. The position of the prongs will not be affected by such adjustments, since they are fixed to the rotor.

The trough 25 may be mounted on an incline, as shown, to feed by gravity, or may be provided with any other suitable means for advancing the bale of hay toward the face plate.

The mill thus far described is substantially the same as that described in the patent. When the rotor is rotated at high speed, it sets up an air-blast, drawing on the opening in the front wall and discharging through the screen and the chimney.

At the same time, the prongs tear into the advancing bale of hay, tearing loose bunches of hay and throwing them outward, due to centrifugal force.

The loose bunches of hay are entrained in the air-blast, are distributed through the entire width of the housing, due to the propeller effect of the blades, and are swept across the inner face of the screen by the blades, with the effect that they are cut and torn against the walls of the screen holes and discharged through the latter.

The capacity of this mill is limited by the capacity of the rotor blades to reduce the hay by sweeping contact with the screen. Since the hay is fed by the prongs in relatively large bunches, the capacity, at times, does not come up to a desired degree, especially where the hay under treatment is particularly tough.

It is the object of the present invention to greatly increase the capacity of the feed mill by adding a preliminary reducing step which cuts the hay into relatively small bunches before it is swept across the screen for final reduction.

This improvement consists in providing a number of cutters 26 on the front face of the face plate 21 to rotate with the latter and to cut cylindrical paths into the hay, while, at the same time loosening the hay for gripping by the prongs.

The cutters, of course, should be very strong, and I preferably provide the same in parallel pairs, as shown in detail in Figures 3 to 5, inclusive.

For mounting the cutter, I provide a base 27 of the form shown in Figure 3, and mount the same upon the face plate, to project forwardly therefrom, preferably by welding, as shown at 28. The base is in the form of a sturdy metal plate having tapered end edges 29 and a flat top 30.

The individual cutting blades 31 are bolted upon opposite sides of the base, as at 32, and are dimensioned to project beyond the base. They are formed with tapered cutting edges 33, and each cutter is mounted on the face plate in such a manner as to present a pair of parallel cutting edges in the direction of travel.

The cutters are placed on the face plate in circumferentially spaced relation and at different radial distances from the center of rotation, so that they cut spaced concentric paths or swaths into the advancing bale of hay.

The cutters are preferably arranged with respect to the prongs to describe different circular paths.

The term radius or radial distance as employed in the specification and claims is intended to denote a line defining the shortest distance between the axis of rotation at the center of the rotor and a particular element, such as a prong or a cutting member.

In operation:

As the bale of hay is fed toward the face plate, and the rotor rotates at high speed, an air-blast is set up for drawing air through the opening in the front wall and for discharging the air through the screen.

At the same time, the cutters cut circular paths into the forward end of the bale of hay, generally loosening and reducing the hay while the prongs tear into the hay and throw it outward in relatively small bunches, which are entrained in the air-blast and are pulverized and further reduced in sweeping across the screen for final discharge through the latter.

Since the hay reaches the screen in greatly reduced form, it is torn and shredded by the sweeping impact upon the screen much more readily than in the original Miller machine shown in the patent, with a resulting greater capacity.

I claim:

1. In a feed mill of the character described, a housing having parallel front and rear walls and an annular screen supported between the walls, a feed opening in said front wall, a rotor revolvable in the housing about an axis concentric with the screen and having a front plate with a forward face facing the opening, said front plate having vanes disposed adjacent the screen for directing an air blast from the opening through the screen when the rotor is rotated, means for feeding a bale of hay through the opening toward said front plate, a plurality of cutting means secured to said front face of the front plate and extending toward said opening for projecting into the bale of hay, said cutting means being mounted at different radial distances from said axis, each of said cutting means having an elongated tapered cutting edge extending away from said forward face of the front plate and disposed in a plane substantially normal to a radius passing therethrough from said axis, said cutting edge being presented in the direction of rotation of said rotor and inclined rearwardly of the direction of rotation thereof such that the cutting means cut concentric annular paths into the hay so as to cut strands of hay crossing said paths and to partly reduce the hay for ready entraining in the air blast, a plurality of cylindrical non-cutting prongs secured to said forward face of the front plate and extending toward said opening, said prongs being mounted at different radial distances from said axis, the prongs being mounted at radial distances intermediate the radial distances at which some of said cutting means are mounted for tearing into the partly reduced hay and throwing bunches thereof into the air blast, said radial vanes serving to sweep the entrained hay against the screen for further reduction and discharge therefrom.

2. A feed mill as defined in claim 1 wherein each of said cutting means includes a pair of cutter members disposed in substantially parallel relationship with one another, each of said cutter members having said first mentioned cutting edge formed on one edge portion and a second tapered cutting edge formed on another edge portion and disposed in the same plane as said first mentioned cutting edge, said second cutting edge being inclined forwardly of the direction of rotation of said rotor, said first and second cutting edges of each of said cutting members being disposed at substantially the same angle with respect to said forward face of the front plate.

References Cited in the file of this patent

UNITED STATES PATENTS

| 200,540 | Jeffers | Feb. 19, 1878 |
| 381,261 | Lethert | Apr. 17, 1888 |
| 664,852 | Green | Jan. 1, 1901 |
| 1,816,050 | Lee | July 28, 1931 |
| 2,248,640 | Miller | July 8, 1941 |
| 2,322,306 | McLaren | June 22, 1943 |

FOREIGN PATENTS

| 46,614 | Sweden | Mar. 3, 1920 |
| 269,458 | Germany | Jan. 22, 1914 |
| 671,996 | France | Sept. 9, 1929 |
| 889,625 | France | Oct. 11, 1943 |